United States Patent [19]
Otto et al.

[11] Patent Number: 5,745,575
[45] Date of Patent: Apr. 28, 1998

[54] IDENTIFICATION-FRIEND-OR-FOE (IFF) SYSTEM USING VARIABLE CODES

[75] Inventors: William F. Otto, deceased, late of Huntsville, Ala.; William F. Otto, Jr., heir, Moorpark, Calif.; Lorinda R. Otto, heiress; Robert A. Otto, heir, both of Huntsville, Ala.; Debbee J. Jordan, Valhermoso Springs, Ala.; Miles E. Holloman, Decatur, Ala.; Stanley P. Patterson, Huntsville, Ala.

[73] Assignee: The United States of America as represented by the Secretary of the Army, Washington, D.C.

[21] Appl. No.: 668,608

[22] Filed: May 20, 1996

[51] Int. Cl.⁶ .............................. H04L 9/32; G01S 13/74
[52] U.S. Cl. .............................. 380/23; 342/45
[58] Field of Search .............................. 342/45; 380/23

[56] References Cited

U.S. PATENT DOCUMENTS

| | | |
|---|---|---|
| 4,566,009 | 1/1986 | Hanni et al. .............................. 342/45 |
| 4,862,176 | 8/1989 | Voles .............................. 342/45 |
| 4,991,209 | 2/1991 | Kolbert .............................. 380/28 |
| 5,448,052 | 9/1995 | Taylor et al. .............................. 250/201.9 |
| 5,448,643 | 9/1995 | Parker .............................. 380/59 |
| 5,583,507 | 12/1996 | D'Isepo et al. .............................. 342/45 |

*Primary Examiner*—Gilberto Barrón, Jr.
*Attorney, Agent, or Firm*—Hugh P. Nicholson; Freddie M. Bush; Hay Kyung Chang

[57] ABSTRACT

An Identification-Friend-or-Foe System Using Variable Codes (IFF System) utilizes variable codes and pre-selected encryption/decryption technology to querry potential targets as to their battlefield affiliation and also to identify itself as a friend to a potential attacker. The IFF System performs a querry by sending a narrow laser beam to the potential target which is accompanied or closely followed by a radio frequency (RF) wave modulated with encrypted identification information. If the potential target is also equipped with the IFF System and in possession of the valid code, then the received RF wave can be decrypted to reveal the potential attacker as a friend. The potential target, then, encrypts its own identification information using the same code and transmits it via RF wave to the potential attacker. Thus fratricides may be avoided.

8 Claims, 2 Drawing Sheets

IDENTIFICATION-FRIEND-OR-FOE (IFF) SYSTEM USING VARIABLE CODES

DEDICATORY CLAUSE

The invention described herein may be manufactured, used and licensed by or for the Government for governmental purposes without the payment to us of any royalties thereon.

BACKGROUND OF THE INVENTION

High performance belligerent vehicles facing each other on the battlefield need to have the means of insuring that the potential target vehicles are not friendly. This is to avoid the morally and politically unacceptable destruction (however unintentional or occasional) of friendly forces.

SUMMARY OF THE INVENTION

The Identification-Friend-or-Foe System Using Variable Codes (hereinafter, the IFF System) is a simple yet highly accurate and reliable identification system that utilizes codes that are manually variable at pre-set intervals of time. The codes are used as encryption/decryption keys to encrypt pertinent identification information prior to transmitting outgoing RF (radio frequency) wave modulated by the encrypted information toward the potential target vehicle and to decrypt any incoming RF wave. The potential target vehicle, if also equipped with the IFF System and possessed of the pre-selected code, receives the RF wave and decrypts it to learn that the interrogating vehicle is friendly. The receiving vehicle, then, encrypts its own identification information, using the same pre-selected code, and transmits its own RF wave modulated by its own encrypted information to the interrogating vehicle which, in turn, decrypts the incoming RF wave to learn that the potential target vehicle, in fact, is friendly. The encryption or the decryption cannot be performed by the IFF System without the valid code. Hence, if the potential target vehicle does not possess the code, even if it possesses a captured IFF System, then it can neither decrypt the interrogator's signals nor encrypt its own identification information to communicate its friendly nature to the interrogating vehicle.

It is desired that the IFF System operate in all weather conditions that permit air attack of ground vehicles. This means day or night with 0.8 kilometer visibility. In clear weather, the IFF System is expected to be effective at ranges of up to 10 kilometers.

DESCRIPTION OF THE PREFERRED EMBODIMENT

Figure 1:
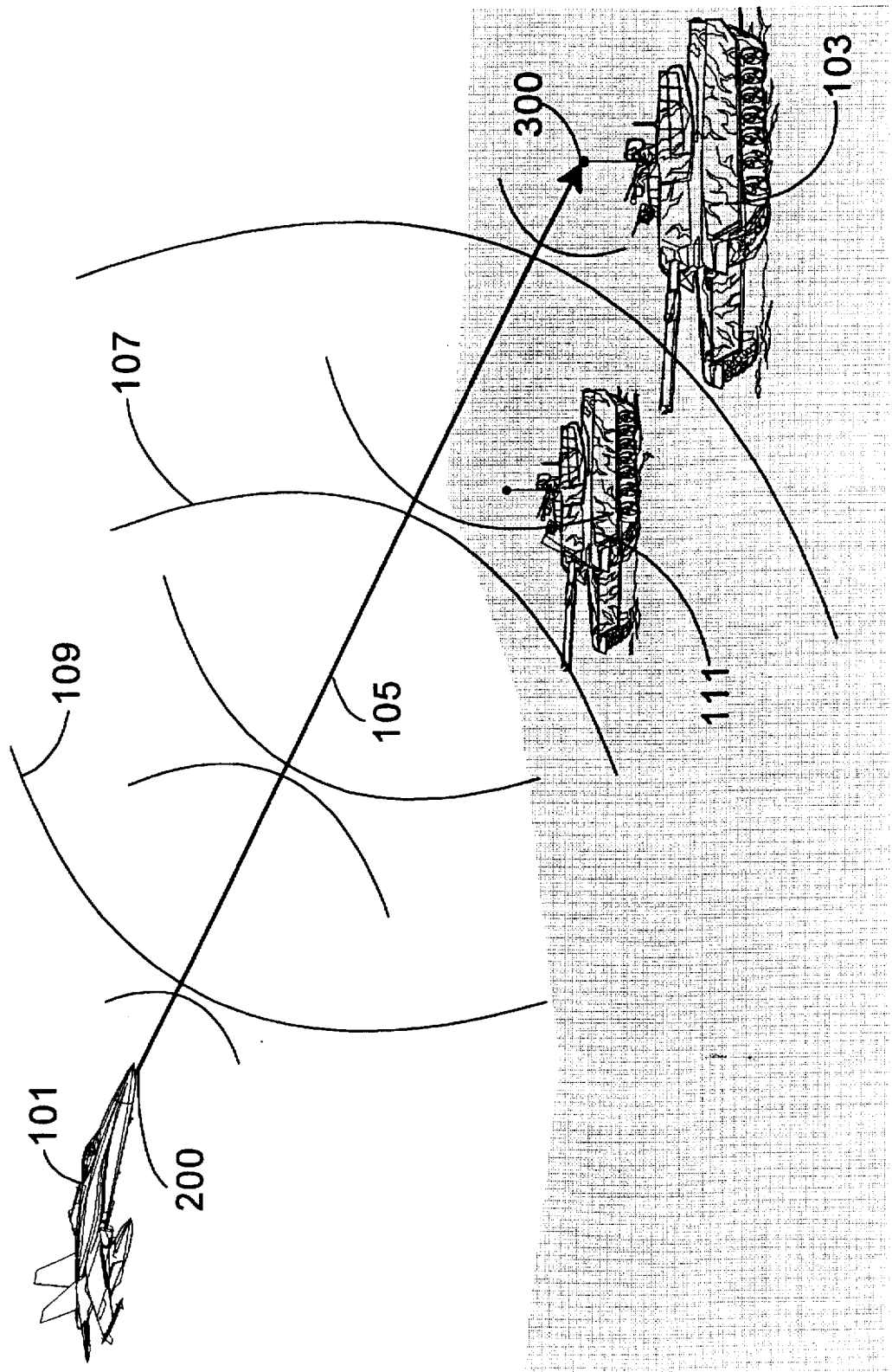
FIG. 1 illustrates a typical battlefield environment in which the IFF System of the present invention may be employed.

With reference now to the drawing wherein like numbers refer to like parts and arrows indicate the direction of signal travel, the structure and both the interrogating and receiving modes of the IFF System are explained in detail.

Figure 2:
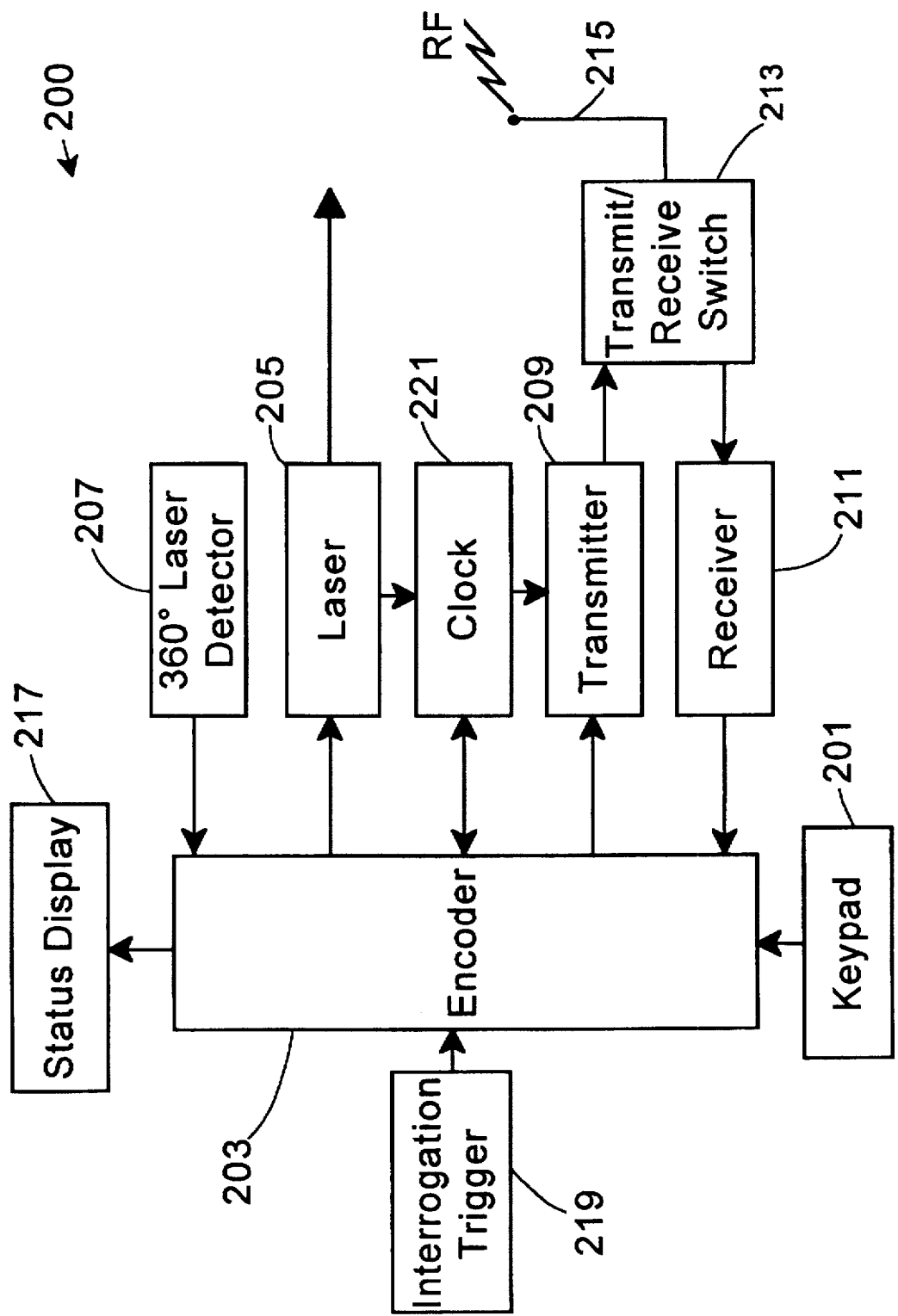
FIG. 2 shows a diagram of a preferred embodiment of the IFF System.

FIG. 1 presents an overall view of a typical battlefield scene involving the use of the IFF System, one such system 200 being located on aerial vehicle 101 and another system 300 being located on ground vehicle 103 while the two vehicles attempt to identify each other's belligerent nature so that erroneous fratricide may be avoided. It is noted that IFF Systems 200 and 300 are identical in every aspect except in their respective locations; therefore, the following description of IFF System 200 is equally applicable to IFF System 300. Further, the depiction of an aerial vehicle and a ground vehicle in FIG. 1 is merely illustrative: the IFF System is just as effective in achieving identification between any two vehicles that are equipped with the IFF System whether they both be aerial or ground vehicles. FIG. 2 illustrates the structure of the IFF System in detail.

To initiate the interrogating mode, the operator of the IFF System 200 located on aerial vehicle 101 first checks the UHF channel to see if it is clear for use, since the IFF System utilizes a UHF transmitter. Then when the channel has been clear for one millisecond, interrogation trigger 219 is engaged which action, via encoder 203, causes a 30-nanosecond interrogation laser pulse to be emitted by optical laser 205, such as a neodymium laser. The laser pulse, thusly emitted and whose path is represented by line 105, travels to and is incident on a particular target vehicle 103. The beam width of the pulse is narrow which allows the operator of the IFF System to aim the pulse at a particular potential target vehicle 103 to the exclusion of other nearby vehicles such as tank 111. This ability to aim at a particular vehicle provides unequalled directivity.

When the laser pulse is detected by laser detector 207 of the IFF System 300 located on querried vehicle 103, then the personnel of vehicle 103 are alerted that an IFF process has been initiated. Whereas laser 205 directs its pulses at a single entity, laser detector 207 scans 360° of the sky for any laser pulse that may be incident upon it from any direction. Simultaneously, or almost simultaneously, with the emission of the laser pulse, RF energy 107 in UHF range is transmitted toward ground vehicle 103 to querry the latter's battlefield affiliation. Thereafter, RF energy 109, also in UHF range, goes from the ground vehicle to the aerial vehicle with the former's response to the querry.

Turning now to FIG. 2, the function of each element of the preferred embodiment of IFF System 200 is explained, eventually leading to the transmission of the RF wave.

The operator of the IFF System uses keypad 201 to input any suitable identification data such as vehicle identification, date, time of day or friendship flag or any combination thereof and the preselected code to encoder 203. The code changes from time to time, such as every 24 hours (in which case, it is referred to as the code-of-the-day) and is communicated to all friendly forces through secure military channels for manually updating the IFF devices prior to the actual use of the code. The code-of-the-day (if variable once every 24 hours) may be a 64-bit of information which enables encoder 203 to encrypt or decrypt the identification data using the pre-chosen encryption/decryption technology (example: Data Encryption Standard) that resides within the encoder. The variability of the code is intended to limit the usefulness to the enemy of any captured IFF System to no more than as long as the code is valid.

Upon encryption, encoder 203 outputs digital data stream incorporating therein the encrypted identification data and couples the data stream to UHF transmitter 209 where the data stream modulates the outgoing RF energy that is broadcast from the transmitter via antenna 215. UHF is preferred for the broadcast signals since they must be omnidirectional and the desired 10 kilometer range is easily achievable at low power (1 watt). This broadcast of the outgoing RF energy may be simultaneous with the emission of the interrogation laser pulses or slightly after the emission. Any delay (up to 1 millisecond) of the broadcast is controlled by clock 221 that is coupled between laser 205 and transmitter 209, and also to encoder 203.

Turning now to the receiving mode: upon detection of the initiating laser pulse by laser detector 207, antenna 215 is prompted to collect the incoming RF energy. (The antenna is always in the receive-mode unless the IFF System is interrogating or responding, in which case the antenna is switched to the transmitting mode by the transmit/receive switch 213.) The collected RF energy is then relayed to receiver 211 which converts the energy into digital data stream and inputs the stream to encoder 203. The encoder utilizes the resident encryption/decryption technology and the code-of-the-day to decrypt the digital data stream and uncover therefrom the identification information sent by ground vehicle 103. It is clear then that if ground vehicle 103 does not possess the valid code-of-the-day, the incoming RF energy received by aerial vehicle 101 would not have been encrypted properly enabling it to be decrypted by the aerial vehicle to reveal any intelligible identification information. Rather, what is received by the aerial vehicle would be a garble that is unsusceptible to being decrypted using the code-of-the-day. The result of the decryption effort, either successful or unsuccessful, is displayed by status display 217 as friendly or unknown, respectively, for the operator's observation and appropriate action.

The above-described exchange of signals between the aerial and ground vehicles takes less than one millisecond, leaving ample time for retries to confirm the result if the exchange fails to produce a friendly identification or otherwise fails to complete properly. The retries are all RF transmissions and are performed while laser 205 is recharging. The retries are made automatic by pre-programming encoder 203 to accomplish the same. The encoder outputs digital data stream incorporating therein the encrypted identification data and couples the data stream to UHF transmitter 209 where the data stream modulates the outgoing RF energy that is broadcast from the transmitter via antenna 215. The digital data stream may include retry flag set and approximate coordinates of targeted vehicle 103. The number of retries is determined by the time period necessary to recharge laser 205.

Although a particular embodiment and form of this invention has been illustrated, it is apparent that various modifications and embodiments of the invention may be made by those skilled in the art without departing from the scope and spirit of the foregoing disclosure. Accordingly, the scope of the invention should be limited only by the claims appended hereto.

We claim:

1. An identification-friend-or-foe (IFF) system for identifying friendly entities on the battlefield so as to avoid fratricide, said system residing on a first entity and comprising:

a laser for emitting interrogation pulses toward a second entity on the battlefield to signify the initiation of interrogation; an encoder for encrypting and decrypting information input thereto; a means for inputting pre-selected identification information into said encoder; a means for communicating at least one pre-determined, variable code to said encoder, said encoder selectively encrypting and decrypting the identification information using said code and producing outgoing digital data stream containing the encrypted identification information therein; a transmitting means coupled to said encoder for receiving said outgoing data stream from said encoder, said transmitting means being capable of generating outgoing RF energy, said outgoing RF energy being modulated by said outgoing data stream, and transmitting said outgoing, modulated RF energy toward the second entity; a receiving means coupled to said encoder for receiving incoming RF energy, said incoming RF energy having originated from the second entity, converting said incoming RF energy into incoming digital data stream and subsequently inputting said incoming data stream to said encoder to be decrypted thereby using said pre-determined code, the result of the decryption being indicative of the battlefield affiliation of the second entity; and a laser detector for detecting interrogation pulses that may be incident on the first entity from the second entity.

2. An IFF system as set forth in claim 1, wherein said laser detector is omnidirectional.

3. An IFF system as set forth in claim 2, wherein said transmitting means transmits said outgoing RF energy in UHF range.

4. An IFF system as set forth in claim 3, wherein said laser is a neodymium laser.

5. An IFF system as set forth in claim 4, wherein said system further comprises a means for displaying the battlefield affiliation of the second entity, said displaying means being connected to said encoder to receive decrypted information from said encoder.

6. An IFF system as set forth in claim 5, wherein said transmitting means and said receiving means comprise a transmitter and a receiver, respectively, and wherein said system still further comprises an antenna, said antenna being coupled between said transmitter and receiver and being capable of selectively disseminating and collecting RF energy.

7. An IFF system as set forth in claim 6, wherein the transmission of said outgoing RF energy occurs simultaneously with the emission of the interrogation laser pulses.

8. An IFF system as set forth in claim 7, wherein said system still further comprises a means for delaying the transmission of said outgoing RF energy up to 1 millisecond after the emission of the interrogation laser pulses.

* * * * *